US012774784B2

(12) United States Patent
Humenberger et al.

(10) Patent No.: US 12,774,784 B2
(45) Date of Patent: Oct. 27, 2026

(54) CRYOGENIC TANK

(71) Applicant: MAGNA Energy Storage Systems GesmbH, Sinabelkirchen (AT)

(72) Inventors: Harald Humenberger, St. Ruprecht (AT); Rainer Puchleitner, Graz (AT); Stefan Zink, Werndorf (AT)

(73) Assignee: MAGNA Energy Storage Systems GesmbH, Sinabelkirchen (AT)

( * ) Notice: Subject to any disclaimer, the term of this patent is extended or adjusted under 35 U.S.C. 154(b) by 283 days.

(21) Appl. No.: 18/307,056

(22) Filed: Apr. 26, 2023

(65) Prior Publication Data

US 2023/0375135 A1 Nov. 23, 2023

(30) Foreign Application Priority Data

May 18, 2022 (EP) .................................... 22173969

(51) Int. Cl.
*F17C 3/08* (2006.01)

(52) U.S. Cl.
CPC ........ *F17C 3/08* (2013.01); *F17C 2201/0109* (2013.01); *F17C 2203/0304* (2013.01); *F17C 2203/0391* (2013.01); *F17C 2205/0323* (2013.01); *F17C 2205/0355* (2013.01); *F17C 2221/012* (2013.01);

(Continued)

(58) Field of Classification Search
CPC ................ F17C 3/08; F17C 2201/0109; F17C 2203/0304; F17C 2203/0391; F17C 2205/0323; F17C 2205/0355; F17C 2221/012; F17C 2223/0161; F17C 2227/03; F17C 2270/0168; F17C 2270/0189; F17C 2270/0197; F17C 2201/035; F17C 2201/054; F17C 2201/056; F17C 2203/032; F17C 2203/0629; F17C 2205/0305; F17C 2205/0311; F17C 2205/0391;

(Continued)

(56) References Cited

U.S. PATENT DOCUMENTS

| | | | | |
|---|---|---|---|---|
| 3,062,017 A * | 11/1962 | Balcar | ...................... | F17C 9/02 62/48.1 |
| 4,472,946 A * | 9/1984 | Zwick | ...................... | F17C 3/02 417/901 |

(Continued)

FOREIGN PATENT DOCUMENTS

| | | |
|---|---|---|
| CA | 2441775 A1 * | 9/2003 |
| EP | 3056794 A1 | 8/2016 |

(Continued)

OTHER PUBLICATIONS

European Search Report for Application No. 22173969.1, mailed Nov. 11, 2022, 4 pages.

*Primary Examiner* — Joel M Attey
*Assistant Examiner* — Ibrahim A. Michael Adeniji
(74) *Attorney, Agent, or Firm* — Jordan IP Law, LLC; Todd A. Vaughn

(57) ABSTRACT

A cryogenic tank comprising an inner container for holding a cryogenic medium, and an outer container surrounding the inner container to define a vacuum space. A pocket extends at least from the vacuum space into an interior space of the inner container. One or more functional components are arranged in the pocket. The one or more functional components include one or more heat exchangers, valves, control components and/or tubes.

17 Claims, 2 Drawing Sheets

(52) U.S. Cl.
CPC .. *F17C 2223/0161* (2013.01); *F17C 2227/03* (2013.01); *F17C 2270/0168* (2013.01); *F17C 2270/0189* (2013.01); *F17C 2270/0197* (2013.01)

(58) Field of Classification Search
CPC ........ F17C 2205/0394; F17C 2223/033; F17C 2260/033; F17C 13/04; Y02E 60/32
See application file for complete search history.

(56) References Cited

U.S. PATENT DOCUMENTS 4,528,144 A * 7/1985 Gutierrez .............. C07C 309/00 510/427
4,646,525 A * 3/1987 Delacour .................. F17C 9/00 62/51.1
4,783,969 A * 11/1988 Hohol ....................... F17C 9/00 62/51.1
4,860,545 A * 8/1989 Zwick ................... F17C 13/005 417/901
5,357,758 A * 10/1994 Andonian ................. F17C 9/02 62/48.1
5,651,473 A 7/1997 Preston et al.
6,230,516 B1 * 5/2001 Andonian ................. F17C 1/12 62/461
7,481,074 B2 * 1/2009 Cirucci .................... F25J 3/028 62/48.1
8,104,296 B2 1/2012 Harper et al.
2002/0008111 A1 * 1/2002 Pelloux-Gervais ....... F17C 3/04 220/560.13
2003/0122543 A1 * 7/2003 Shirakawa ............. G01R 33/02 62/51.1
2005/0139600 A1 6/2005 Harper et al.
2008/0197137 A1 * 8/2008 Schlag ...................... F17C 3/08 220/560.12
2008/0209915 A1 * 9/2008 Harper ...................... F17C 3/00 62/45.1
2009/0293729 A1 * 12/2009 Behruzi ................ F17C 13/088 220/560.04
2019/0145580 A1 * 5/2019 Posselt .................. F17C 13/001 220/560.12
2020/0332959 A1 * 10/2020 Ehegartner ........... F17C 13/001
2021/0270420 A1 * 9/2021 Rosenbaum .............. F17C 7/02
2021/0317953 A1 * 10/2021 Konfrst ..................... F17C 7/04
2022/0381403 A1 * 12/2022 Ehgartner ................. F17C 3/08
2023/0143288 A1 * 5/2023 Orchard .................... F17C 3/08 244/135 R
2024/0142057 A1 * 5/2024 Sébastien ................ F04B 15/08

FOREIGN PATENT DOCUMENTS

GB 2601994 A * 6/2022 ............. G01F 25/15
WO 2021052994 A2 3/2021

* cited by examiner

CRYOGENIC TANK

CROSS-REFERENCE TO RELATED APPLICATIONS

The present application claims priority under 35 U.S.C. § 119 to European Patent Publication No. EP 22173969.1 (filed on May 18, 2022), which is hereby incorporated by reference in its entirety.

TECHNICAL FIELD

Embodiments relate to a cryogenic tank comprising an inner container for holding a cryogenic medium, in particular hydrogen, and an outer container surrounding the inner container.

BACKGROUND

Cryogenic tanks are known per se and are used for storing cryogenic liquids, in particular liquid hydrogen. In particular, the medium can be used as a fuel for a driven or flying means of transport, for example for a motor vehicle, an aircraft or a space rocket. Cryogenic tanks usually have an inner container, in which the medium stored in the tank, that is to say in particular the hydrogen, is held, and an outer container surrounding the inner container. A vacuum is usually set up between the inner container and the outer container in order to reduce heat transfer from the outside to the inside. Such cryogenic tanks can be cylindrical.

Necessary functional components of such a cryogenic tank, such as valves, control components and tubes, are arranged, for example, on the end of the cryogenic tank, outside the outer container or in the vacuum space between the outer container and the inner container. When the functional components are arranged on the end, it is usually necessary to shorten the axial length of the cryogenic tank, at least of the inner container, and therefore less volume is available for the storage of the medium.

SUMMARY

It is an object of the disclosure to specify a cryogenic tank which, despite the installation of functional components, has an inner container volume which is as large as possible, given a predetermined installation space.

The object is achieved by a cryogenic tank comprising an inner container for holding a cryogenic medium, in particular hydrogen, and an outer container surrounding the inner container, wherein a vacuum space is set up between the inner container and the outer container, wherein a pocket extends at least from the vacuum space into the interior space of the inner container, wherein one or more functional components are arranged in the pocket, such as one or more heat exchangers, valves, control components and/or tubes.

According to the disclosure, a cryogenic tank thus has at least one pocket, that is to say a pocket-like depression or hollow, with a bottom at the end of the pocket, that is to say within the usual volume of the inner container. The pocket therefore extends from outside the inner container, i.e., at least from the vacuum space, optionally also from the outer container or from outside the outer container, into the usual geometry of the inner container, in order to delimit a volume which usually belongs to the interior space of the inner container and, as part of the interior space of the pocket, to make it topologically an outer space of the inner container. Here, the interior space of the pocket is accessible from outside the inner container, preferably from the vacuum space. In this case, the diameter of the pocket is smaller than the diameter of the inner container at the point at which the pocket extends into the inner container. As a result, less volume of the inner container is lost than if the entire inner container, over its entire diameter, were shortened.

Functional components are arranged in the pocket. The functional components can be, in particular, auxiliary system components. The functional components can thus also be arranged within the usual interior space of the inner container and are separated and protected there from the medium in the inner container by the boundary wall of the pocket.

The displaced volume of a pocket extending into the inner container for accommodating the required components is smaller than in the case of a reduction in the length of the entire cylinder of the inner container.

Further developments of the disclosure are specified in the dependent claims, the description and the attached drawings.

The pocket is preferably formed at least in some section or sections by a jacket tube which extends into the interior space of the inner container. The pocket is preferably cylindrical at least in some section or sections. The pocket is closed at its end, i.e. it preferably has a bottom at the end of the cylinder.

The pocket is preferably closed by a cover, in particular with respect to the vacuum space or with respect to the outside of the outer container. The cover is preferably a separate component.

Preferably, at least one pipe leads from outside the pocket to a functional component arranged in the pocket, preferably at least two or at least four pipes. The pipe can be set up to carry the medium stored in the cryogenic tank or a temperature control fluid or coolant to the functional component or away from it. Preferably, at least four pipes lead from outside the pocket to a functional component arranged in the pocket, in particular to a heat exchanger arranged in the pocket. In this case, at least one pipe can be set up for the supply and one pipe can be set up for the discharge of the cryogenic medium held in the inner container, and at least one pipe can be set up for the supply and one pipe can be set up for the discharge of a temperature control fluid. The heat exchanger thus serves to control the temperature of the cryogenic medium, in particular hydrogen, held in the inner container, this medium being guided from a region outside the pocket and preferably from a region outside the inner container into the pocket for temperature control there.

The cryogenic medium, in particular hydrogen, held in the inner container is preferably supplied to a functional component in the pocket through a pipe from the outside of the inner container, from the vacuum space or from the space outside the outer container, particularly preferably through the cover of the pocket.

At least one pipe, preferably all the pipes, which leads/lead from outside the pocket to a functional component arranged in the pocket, is/are preferably passed through an opening in the cover of the pocket, preferably being passed through an opening, assigned to the respective pipe, in the cover of the pocket.

The pocket is preferably aligned parallel to the longitudinal central axis of the cryogenic tank or is aligned so as to be normal to the longitudinal central axis of the cryogenic tank.

The pocket preferably extends inwards from an end cap at the end of the inner container, or from a lateral surface of the inner container, preferably in the direction of a central point of the inner container.

As a particular preference, the pocket is arranged coaxially with the longitudinal central axis of the cryogenic tank.

As a particular preference, the pocket extends as far as the outer container. The pocket can be designed for suspension of the inner container on the outer container. The pocket can form a polar suspension of the inner container on the outer container.

At least one functional component is preferably arranged in the pocket in such a way that the functional component extends substantially parallel to a side wall of the pocket. In particular, at least one, preferably cylindrical or rod-shaped, heat exchanger and/or at least one tube can run parallel to the pocket or parallel to the side walls of the pocket.

The pocket preferably has thermal insulation for protecting the functional components arranged in the pocket, in particular multi-layer insulation (MLI).

DRAWINGS

Embodiments will be illustrated by way of example in the drawings and explained in the description hereinbelow.

DESCRIPTION

Figure 1:
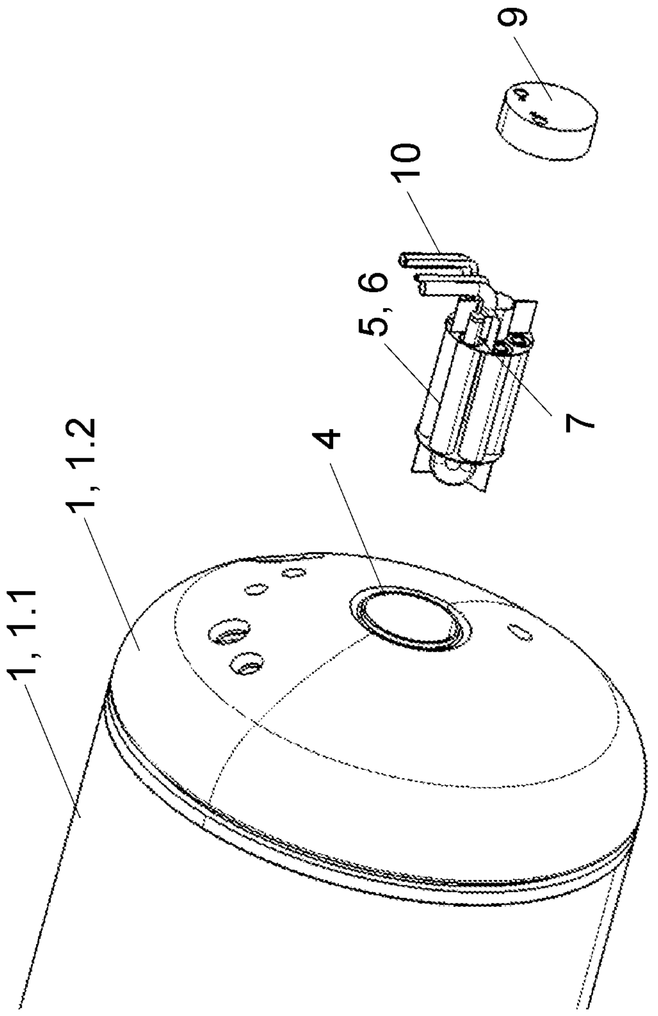
FIG. 1 illustrates an exploded view of an end section of a cryogenic tank according to one or more embodiments, shown without an outer container.
Figure 3:
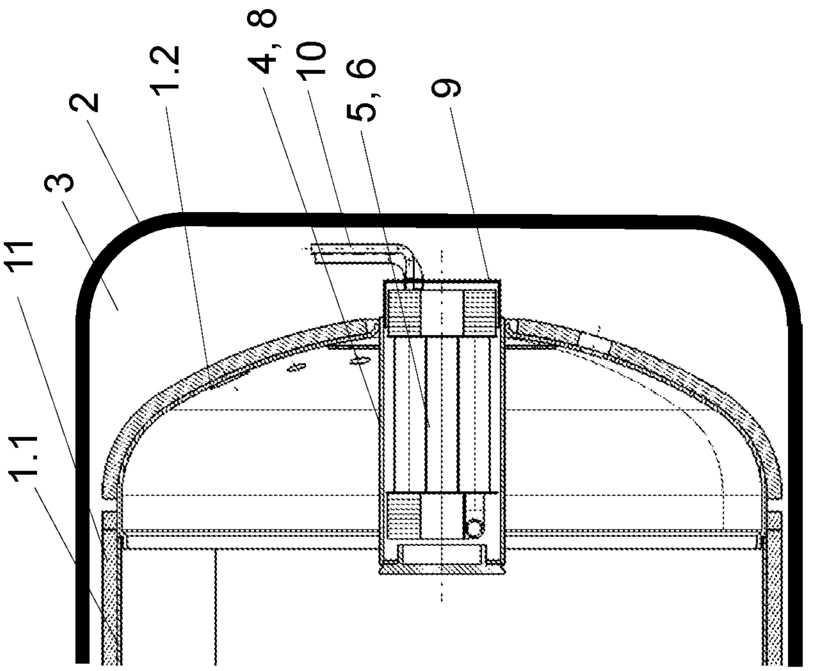
FIG. 3 illustrates a sectional view of the cryogenic tank according to section A-A of FIG. 2, shown with the outer container.
Figure 2:
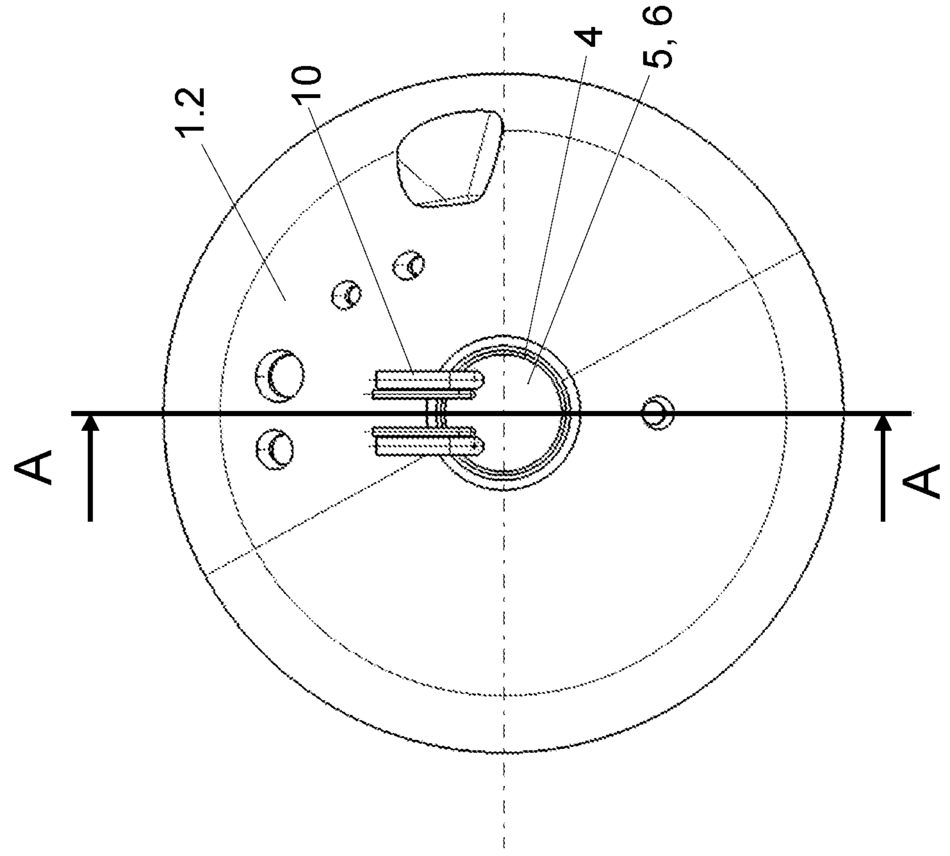
FIG. 2 illustrates a front view of the cryogenic tank of FIG. 1.

FIGS. 1-3 show a cryogenic tank according to one or more embodiments.

The cryogenic tank comprises an inner container 1 for holding a cryogenic medium, in particular hydrogen, and an outer container 2 surrounding the inner container 1, wherein a vacuum space 3 is set up between the inner container 1 and the outer container 2. In addition, container insulation 11 is applied to the outside of the inner container 1 (illustrated in FIG. 3).

The inner container 1 comprises a lateral surface 1.1 of the inner container 1 and an end cap 1.2 on the end of the inner container 1.

A pocket 4 extends from the vacuum space 3 into the interior space of the inner container 1, thus forming a hollow in the volume normally enclosed by the inner container 1, which in the example shown essentially forms a cylinder with convex ends.

At least one functional component 5, namely a heat exchanger 6, is arranged in the pocket 4. The heat exchanger 6 is arranged within a spatial region which is usually located in the interior space of the inner container but which is separated by the pocket 4 from the medium in the interior space. The pocket 4 is substantially cylindrical. The diameter of the pocket 4 is smaller than the diameter of the inner container 1, preferably smaller than half the diameter of the inner container 1.

The pocket 4 is formed in some section or sections by a cylindrical sleeve, namely a jacket tube 8, which extends into the interior space of the inner container 1. The jacket tube 8 has a bottom, which can be formed as a separate component or integrally with the jacket tube 8.

The pocket 4 is closed by a cover 9 with respect to the vacuum space 3.

The pocket 4 is aligned parallel to the longitudinal central axis of the cryogenic tank, namely coaxially with the longitudinal central axis of the cryogenic tank. The pocket 4 extends inwards from an end cap 1.2 at the end of the inner container 1 in the direction of a central point of the inner container 1.

The cryogenic medium, in particular hydrogen, held in the inner container 1 is supplied to the heat exchanger 6 in the pocket 4 through a pipe 10 from the outside of the inner container 1, namely through the pipe 10 in the vacuum space 3 and through an opening in the cover 9 of the pocket 4.

A further pipe 10 serves for discharge of the cryogenic medium held in the inner container 1. In addition, two pipes 10 from outside the pocket 4 are set up for supplying and discharging a temperature control fluid or cooling medium.

All the pipes 10 are passed through openings in the cover 9 of the pocket 4 which are assigned to the respective pipe 10.

The pocket 4, in particular the jacket tube 8, has thermal insulation for protecting the functional components 5 arranged in the pocket 4, in particular the heat exchanger 6, in particular, multi-layer insulation (MLI).

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS

1 Inner container
1.1 Lateral surface (inner container)
1.2 End cap (inner container)
2 Outer container
3 Vacuum space
4 Pocket
5 Functional component
6 Heat exchanger
7 Tube
8 Jacket tube
9 Cover
10 Pipe
11 Container insulation

What is claimed is:

1. A cryogenic tank, comprising:
an inner container having an interior space for holding a cryogenic medium, including hydrogen;
an outer container surrounding the inner container to define a vacuum space between the inner container and the outer container;
a pocket, accessible from outside the inner container with a bottom that closes the pocket relative to the interior space of the inner container, extending at least from the vacuum space into the interior space of the inner container to define a closed receiving space separated from the cryogenic medium held in the interior space of the inner container;

a heat exchanger arranged in the pocket to control the temperature of the cryogenic medium in the inner container, the heat exchanger including at least four pipes extending from outside of the pocket and not in communication with the interior space of the inner container, the at least four pipes including a first pipe operable to facilitate supply of cryogenic medium from a cryogenic medium source to the heat exchanger, a second pipe operable to discharge the cryogenic medium from the heat exchanger, a third pipe operable to facilitate supply of a temperature control fluid, and a fourth pipe operable to facilitate discharge of the temperature control fluid from the heat exchanger.

2. The cryogenic tank of claim 1, further comprising a jacket tube that extends into the interior space of the inner container to define at least one or more sections of the pocket.

3. The cryogenic tank of claim 2, wherein the pocket, at least in the one or more sections, has a cylindrical shape.

4. The cryogenic tank of claim 3, further comprising a cover arranged on the jacket tube to close the pocket.

5. The cryogenic tank of claim 1, wherein the at least four pipes extends through an opening in a cover of the pocket.

6. The cryogenic tank of claim 1, wherein the pocket is aligned parallel to a longitudinal central axis of the cryogenic tank.

7. The cryogenic tank of claim 6, wherein the pocket is aligned to be normal to the longitudinal central axis of the cryogenic tank.

8. The cryogenic tank of claim 7, wherein the pocket is arranged coaxially with the longitudinal central axis of the cryogenic tank.

9. The cryogenic tank of claim 1, wherein the pocket extends towards the outer container.

10. The cryogenic tank of claim 9, wherein the pocket is operable to facilitate suspension of the inner container on the outer container.

11. The cryogenic tank of claim 1, further comprising an end cap arranged on the inner container.

12. The cryogenic tank of claim 11, wherein, in a direction of a central point of the inner container, the pocket extends inwardly from the end cap or from a lateral surface of the inner container.

13. The cryogenic tank of claim 2, wherein the heat exchanger is arranged in the pocket for orientation substantially parallel to a longitudinal axis of a side wall of the jacket tube.

14. The cryogenic tank of claim 1, further comprising thermal insulation arranged in the pocket to protect the heat exchanger arranged in the pocket.

15. The cryogenic tank of claim 14, wherein the thermal insulation comprises multi-layer insulation (MLI).

16. A cryogenic tank, comprising:

an inner container having an interior space for holding a cryogenic medium;

an outer container surrounding the inner container to define a vacuum space between the inner container and the outer container;

a pocket extending at least from the vacuum space into the interior space of the inner container to define a closed receiving space separated from the cryogenic medium held in the interior space of the inner container and accessible from outside the inner container with a bottom that closes the pocket relative to the interior space of the inner container;

a cover operable to close the pocket from the vacuum space; and a heat exchanger arranged in the pocket to control the temperature of the cryogenic medium, the heat exchanger including a plurality of pipes extending through the cover from outside of the pocket, the plurality of pipes including a first pipe operable to facilitate supply of cryogenic medium from a cryogenic medium source to the heat exchanger, a second pipe operable to discharge the cryogenic medium held in the inner container, a third pipe operable to facilitate supply of a temperature control fluid, and a fourth pipe operable to facilitate discharge of the temperature control fluid.

17. A cryogenic tank, comprising:

an inner container having an interior space for holding a cryogenic medium;

an outer container surrounding the inner container to define a vacuum space between the inner container and the outer container;

a pocket extending at least from the vacuum space into the interior space of the inner container to define a closed receiving space separated from the cryogenic medium held in the interior space of the inner container and accessible from outside the inner container with a bottom that closes the pocket relative to the interior space of the inner container, the pocket having a diameter that is less than a diameter of the inner container;

a cover having a plurality of openings and operable to close the pocket from the vacuum space; and a heat exchanger arranged in the pocket to control the temperature of the cryogenic medium, the heat exchanger including a plurality of pipes extending through the openings in the cover from outside of the pocket, the plurality of pipes including a first pipe operable to facilitate supply of the cryogenic medium from a cryogenic medium source to the heat exchanger, a second pipe operable to discharge the cryogenic medium in the inner container, a third pipe operable to facilitate supply of a temperature control fluid, and a fourth pipe operable to facilitate discharge of the temperature control fluid.

* * * * *